United States Patent
Crane et al.

(10) Patent No.: US 6,381,533 B1
(45) Date of Patent: Apr. 30, 2002

(54) METHOD AND SYSTEM USING POSITIONS OF CELLULAR PHONES MATCHED TO ROAD NETWORK FOR COLLECTING DATA

(75) Inventors: Aaron I. Crane, Palatine; Joseph R. Roberts, Rolling Meadows; Frank J. Kozak, Naperville, all of IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/379,133

(22) Filed: Aug. 20, 1999

Related U.S. Application Data

(63) Continuation-in-part of application No. 08/951,767, filed on Oct. 16, 1997, now Pat. No. 6,047,234.

(51) Int. Cl.[7] .......................................... G06F 165/00
(52) U.S. Cl. .................. 701/200; 701/25; 701/208; 701/214; 340/988; 340/990
(58) Field of Search ............................ 701/25, 35, 200, 701/201, 208, 212, 213, 214, 117–120; 340/988, 990; 455/432, 433, 436, 439

(56) References Cited

U.S. PATENT DOCUMENTS

| | | |
|---|---|---|
| 4,982,332 A | 1/1991 | Saito et al. |
| 5,146,219 A | 9/1992 | Zechnall |
| 5,182,555 A | 1/1993 | Sumner |
| 5,243,528 A | 9/1993 | Lefebvre |
| 5,315,295 A | 5/1994 | Fujii |
| 5,696,503 A | 12/1997 | Nasburg |
| 5,731,978 A | 3/1998 | Tamai et al. |
| 5,828,585 A | 10/1998 | Welk et al. |
| 5,933,100 A | 8/1999 | Golding |
| 5,948,042 A | 9/1999 | Heimann et al. |
| 6,011,515 A | 1/2000 | Radcliffe et al. |
| 6,061,558 A * | 5/2000 | Kennedy, III et al. ....... 455/411 |
| 6,104,316 A * | 8/2000 | Behr et al. .................. 340/995 |
| 6,128,571 A * | 10/2000 | Ito et al. ..................... 701/201 |
| 6,140,956 A | 10/2000 | Hillman et al. |
| 6,144,916 A | 11/2000 | Wood, Jr. et al. |
| 6,148,193 A * | 11/2000 | Miska et al. ................. 455/410 |
| 6,150,961 A | 11/2000 | Alewine et al. |

FOREIGN PATENT DOCUMENTS

| | | |
|---|---|---|
| DE | 19525291 C1 | 12/1996 |
| EP | 0921509 | 6/1999 |
| WO | WO 96/01531 | 1/1996 |
| WO | WO 96/42179 | 12/1996 |
| WO | WO98/54682 | 12/1998 |

* cited by examiner

*Primary Examiner*—Gertrude Arthur
(74) *Attorney, Agent, or Firm*—Frank J. Kozak; Lawrence M. Kaplan

(57) ABSTRACT

A data collection system and method match the positions of one or more cellular phones, or other types of wireless phones, to data indicating the locations of roads in a geographic area to derive data about phones located in vehicles traveling along the roads. The data about phones located in vehicles traveling along the roads are used for updating or refining a geographic database, traffic monitoring and reporting, or for other purposes.

23 Claims, 8 Drawing Sheets

US 6,381,533 B1

METHOD AND SYSTEM USING POSITIONS OF CELLULAR PHONES MATCHED TO ROAD NETWORK FOR COLLECTING DATA

REFERENCE TO RELATED APPLICATION

The present application is a continuation-in-part of Ser. No. 08/951,767, filed Oct. 16, 1997, now U.S. Pat. No. 6,047,234, the entire disclosure of which is incorporated by reference herein.

BACKGROUND OF THE INVENTION

The present invention relates to collecting geographic data and more particularly, the present invention relates to a process and system that determines the positions of cellular phones, or other types of wireless phones, matches the positions of the cellular phones to positions of roads in a geographic area, and uses the results of the matching for updating or refining a geographic database, traffic monitoring, or for other purposes.

Geographic databases have various uses. Geographic databases are used in in-vehicle navigation systems, personal computers, networked computing environments, and various other kinds of platforms, as well as on the Internet. Geographic databases are used with various kinds of applications to provide various functions including map display, route calculation, route guidance, truck fleet deployment, traffic control, traffic monitoring, electronic yellow pages, roadside assistance, emergency services, and so on.

In order to provide these kinds of functions, a geographic database includes data that represent geographic features in a covered geographic region. Geographic databases include details about represented geographic features, such as the geographic coordinates of roads in a geographic region, speed limits along the road segments, locations of stop lights, turn restrictions at intersections of roads, address ranges, street names, and so on. Geographic databases may also include information about points of interest in covered regions. Points of interest may include restaurants, hotels, airports, gas stations, stadiums, police stations, and so on.

Collecting information for a geographic database is a significant task. Not only is the initial collection of data a significant undertaking, but a geographic database needs to be updated on a regular basis. For example, new streets are constructed, street names change, traffic lights are installed, and turn restrictions are added to existing roads. Also, new levels of detail may be added about geographic features that are already represented in an existing geographic database. For example, an existing geographic database for roads may be enhanced with information about lane widths, shoulder sizes, lane barriers, address ranges, sidewalks, bicycles paths, etc. Thus, there exists a need to continue to collect information for a geographic database.

One method for collecting data for a geographic database is described in European Patent Application No. EP 0 921 509. According to one embodiment described in EP 0 921 509, navigation systems installed in a plurality of vehicles are used as probes to collect geographic data as the vehicles are driven in a geographic region. These navigation systems may also provide navigation-related features to the drivers and/or passengers of the vehicles in which they are installed or alternatively the navigation systems may serve only to collect geographic data as the vehicles in which they are installed are driven. The geographic data collected by the plurality of vehicles are gathered together, analyzed, and used to update or refine a master geographic database. Copies of the master geographic database, or database products derived from the master copy, can then be distributed back to the plurality of vehicles and used in the navigation systems installed in the plurality of vehicles.

The embodiments described in EP 0 921 509 can afford advantages. However, there is still room for improvement. Accordingly, there exists a need to provide an improved method and system for collecting data for a geographic database.

There also exists a separate need to collect traffic information. Collection of traffic information is important for many purposes. For example, traffic information is used by commuters on a daily basis. Various methods have been used to collect traffic information. These methods have included direct observation, sensors embedded in the roads or located alongside roads, and other means. Although prior methods of collecting traffic information have been adequate, there exists room for improvement. For example, traffic information could be collected less expensively. Also, prior methods of traffic information collection have focused on only certain roads, typically the roads with the highest volumes of traffic. It would be beneficial to collect traffic information for more roads.

SUMMARY OF THE INVENTION

To address these and other objectives, the present invention comprises a method and system that matches the positions of one or more cellular phones, or other types of wireless phones, to data indicating the locations of roads in a geographic area to derive data about phones located in vehicles traveling along the roads. The data about phones located in vehicles traveling along the roads are used for updating or refining a geographic database, traffic monitoring and/or reporting, or for other purposes.

DETAILED DESCRIPTION OF THE PRESENTLY PREFERRED EMBODIMENTS

I. Overview

Figure 1:
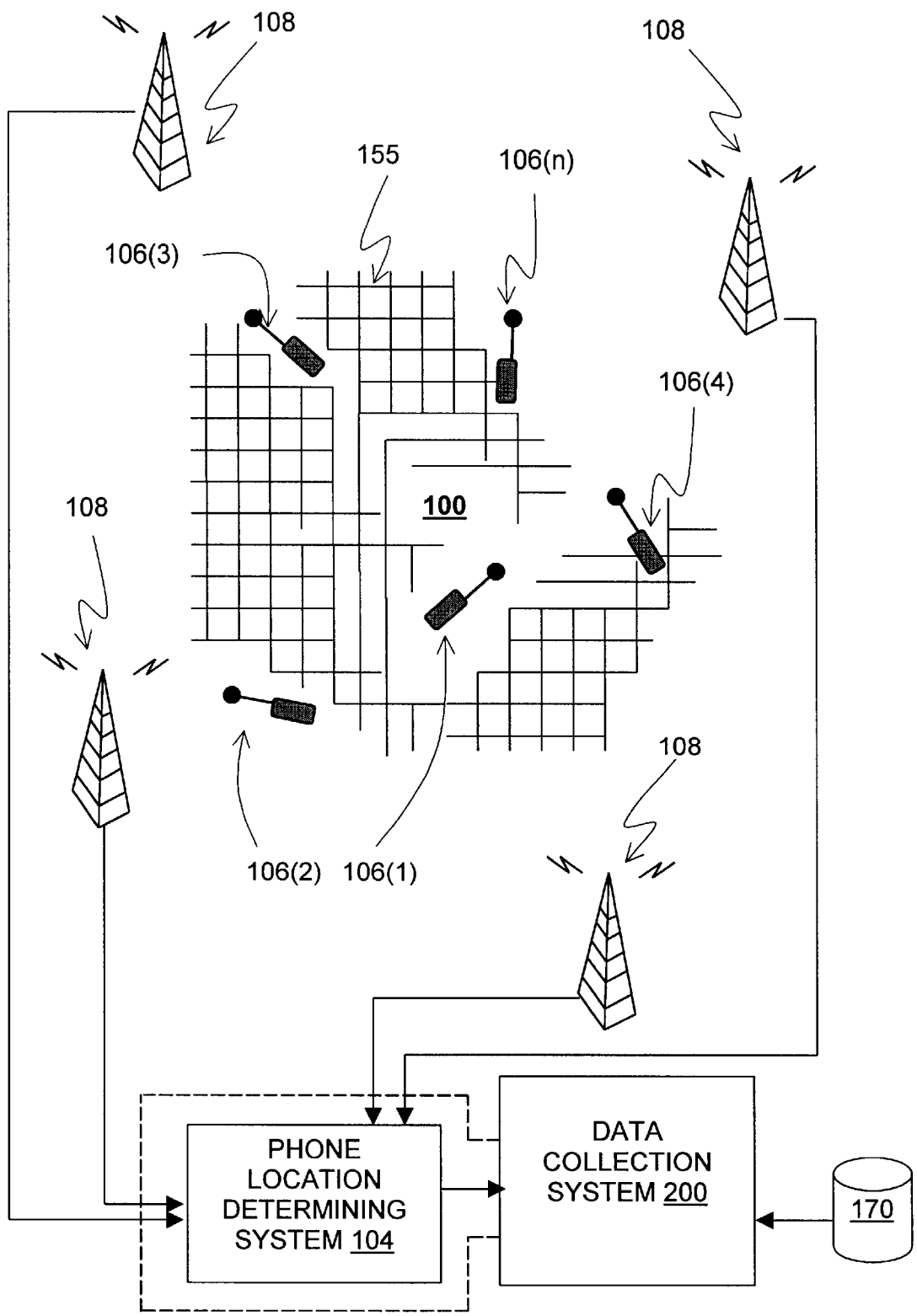
FIG. 1 is an illustration of a cellular phone location determining system located in a geographic region, wherein the cellular phone location determining system is used as a component of a first embodiment of a data collection system.

Referring to FIG. 1, there is an illustration of a geographic area 100. Located in the geographic area 100 is a cellular phone location determining system 104. The cellular phone location determining system 104 may include towers 108 or other equipment located throughout the geographic area 100. The cellular phone location determining system 104 may include appropriate hardware and software that are able to locate the positions of cellular phones 106 in the geographic area 100. There are various available technologies that can be used to determine the positions of cellular phones in an area. Some of these technologies are used to locate a cellular phone user who dials an emergency number, e.g., "911." Any such technology that is presently available or that becomes available in the future may be suitable for the phone location determining system 104 in FIG. 1.

II. Example With Single Phone

Figure 2:
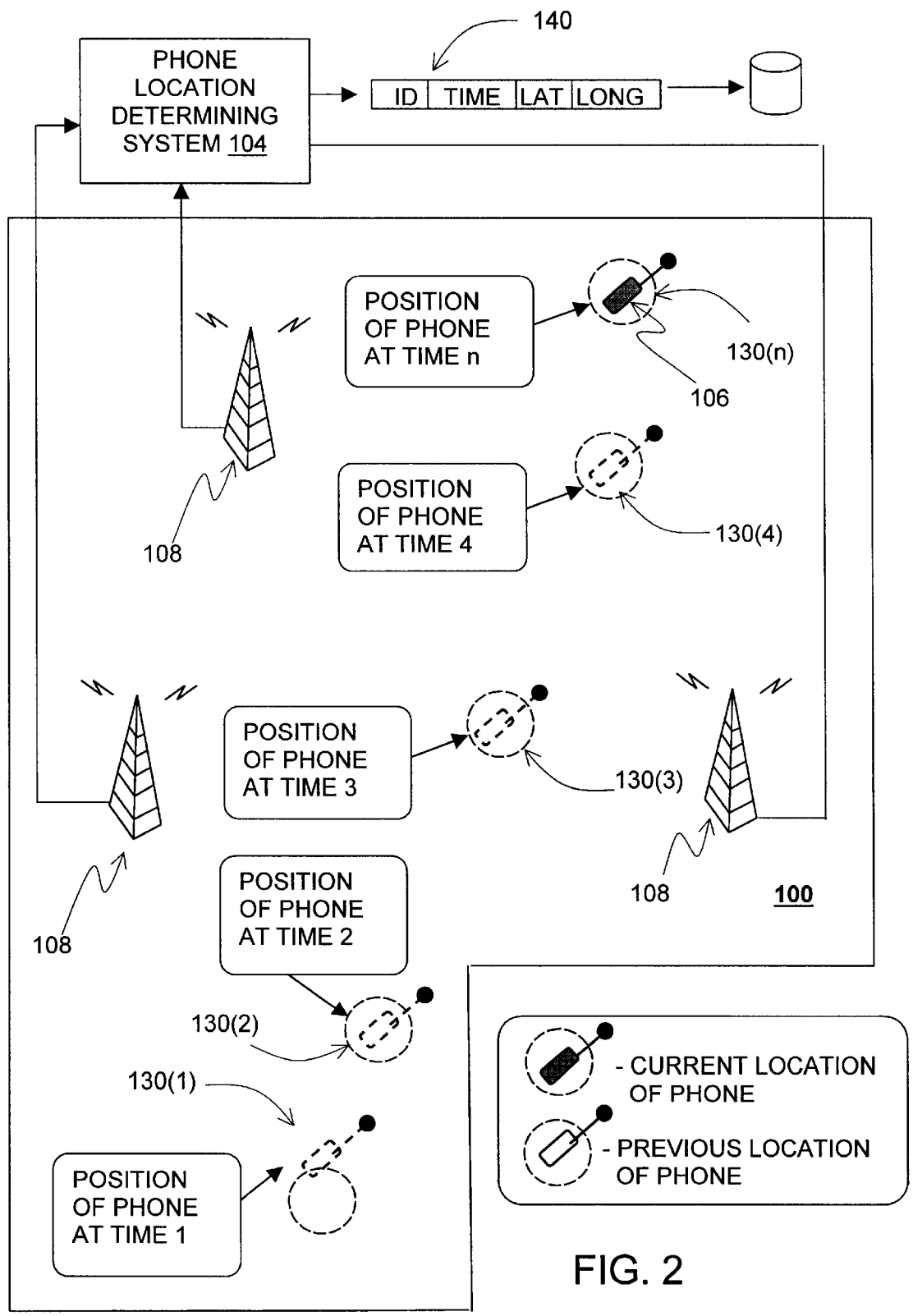
FIG. 2 is a diagram illustrating a series of positions determined over a period of time for a single cellular telephone using the cellular telephone determining system shown in FIG. 1.

Referring to FIG. 2, there is a depiction of a series of locations 130(1), 130(2) . . . 130(n). The series of locations 130(1), 130(2) . . . 130(n) are located in the geographic area 100 of FIG. 1. The series of locations 130(1), 130(2) . . . 130(n) are positions determined for a single cellular phone 106 over a period of time using the cellular phone location determining system 104 in FIG. 1. The series of locations 130(1), 130(2) . . . 130(n) may represent the position of the cellular phone at regular intervals, irregular intervals, or other time periods. The locations may be determined as absolute positions or relative positions. In one embodiment, the cellular phone location determining system 104 outputs data 140 identifying the phone, the position (e.g., geographic coordinates, relative coordinates, etc.), and a time stamp (e.g., the absolute or relative time at which the identified cellular phone was at the identified position).

Figure 3:
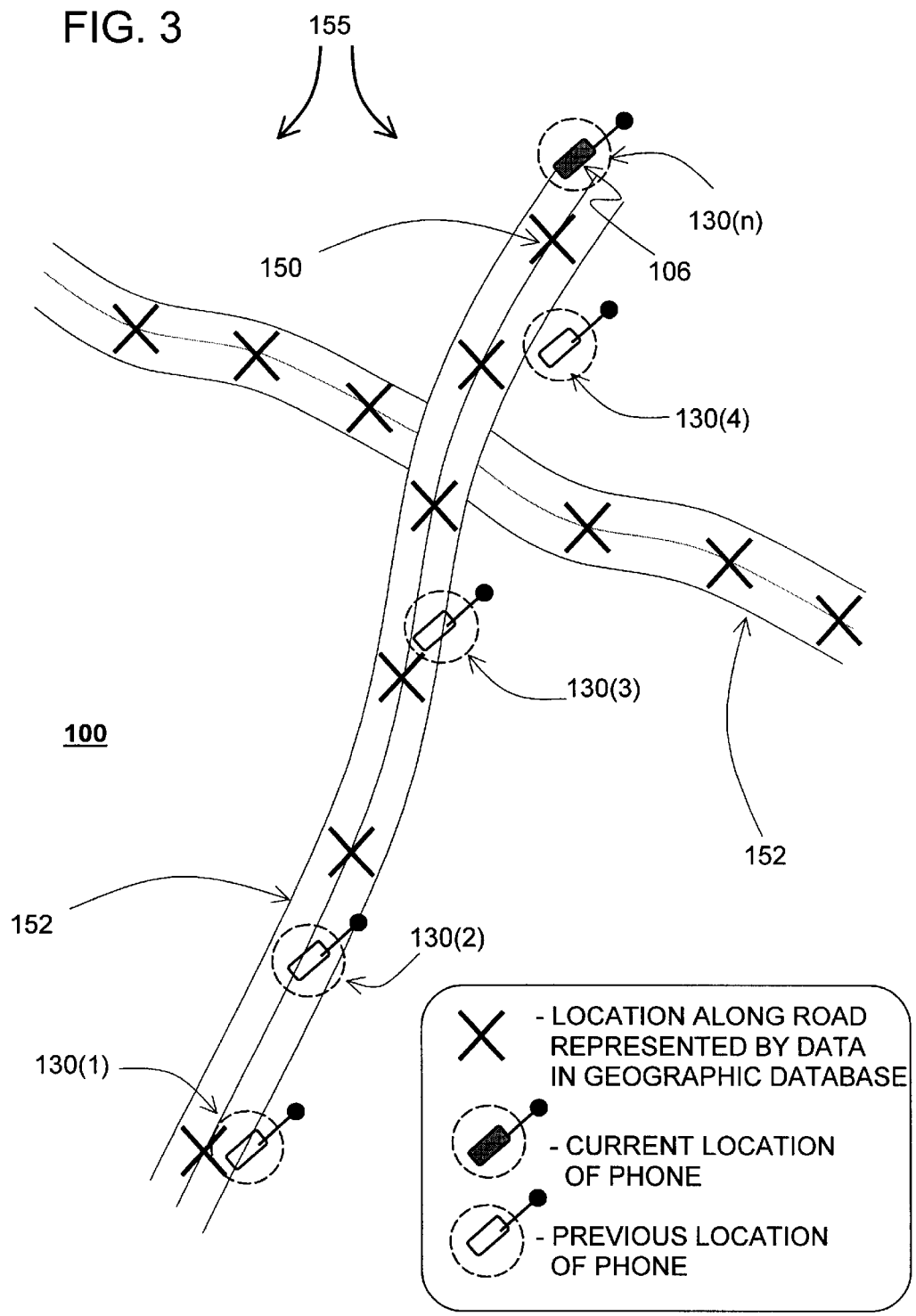
FIG. 3 is a diagram illustrating the series of positions in FIG. 2 overlaid on a map of a portion of the road network of FIG. 1.
Figure 4:
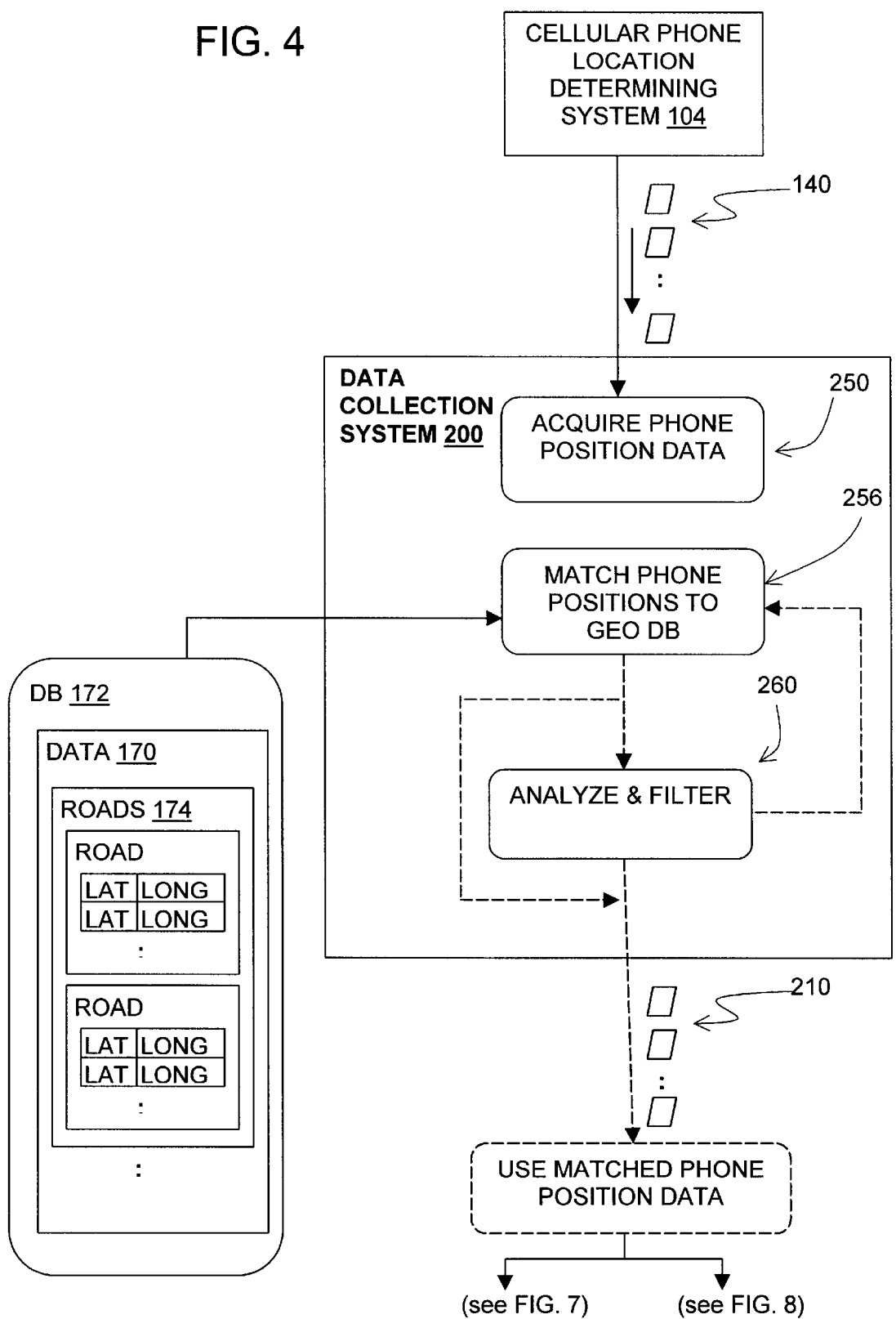
FIG. 4 is a block diagram showing components of the data collection system of FIG. 1.

FIG. 3 shows the depiction of the series of positions 130(1), 130(2) . . . 130(n) of the single cellular phone from FIG. 2. FIG. 3 also shows a plurality of roads 152 that form a road network 155 in the geographic area 100. Referring to FIGS. 3 and 4, the road network 155 is represented by data 170 in a geographic database 172. In FIG. 3, a plurality of points 150 are shown located along the roads 152. The points 150 are positions along each of the roads 152. Each of the points 150 is associated with geographic coordinates that define the location of the point in the geographic area 100. The coordinates may be absolute or relative. The points 150 therefore define the locations of the roads 152 in the geographic area 100. Included among the data 170 are data 174 representing the coordinates of the points along the roads 152 that form the road network 155 represented by the geographic database 172.

In FIG. 4, a data collection system 200 uses the data 140 collected by the cellular phone location determining system 104 in conjunction with the data 170 from the geographic database 172 to generate new data 210. The data collection system 200 matches the acquired cellular phone position data 140 to the locations of roads 152 represented by the data 170 in the geographic database 172. The new data 210 can be used for several purposes as described below.

Referring to FIG. 4, the data collection system 200 includes a process 250 that acquires the data 140 indicating the positions of cellular phones in a geographic area. Then, the data collection system 200 includes a process 256 that matches the acquired cellular phone positions 140 to positions of roads 152 which are represented by the data 170 in the geographic database 172. Various techniques for map matching can be used. For example, map matching techniques are used in navigation systems to match geographic coordinates obtained by GPS systems to geographic data contained in geographic databases that define road positions.

Figure 5:
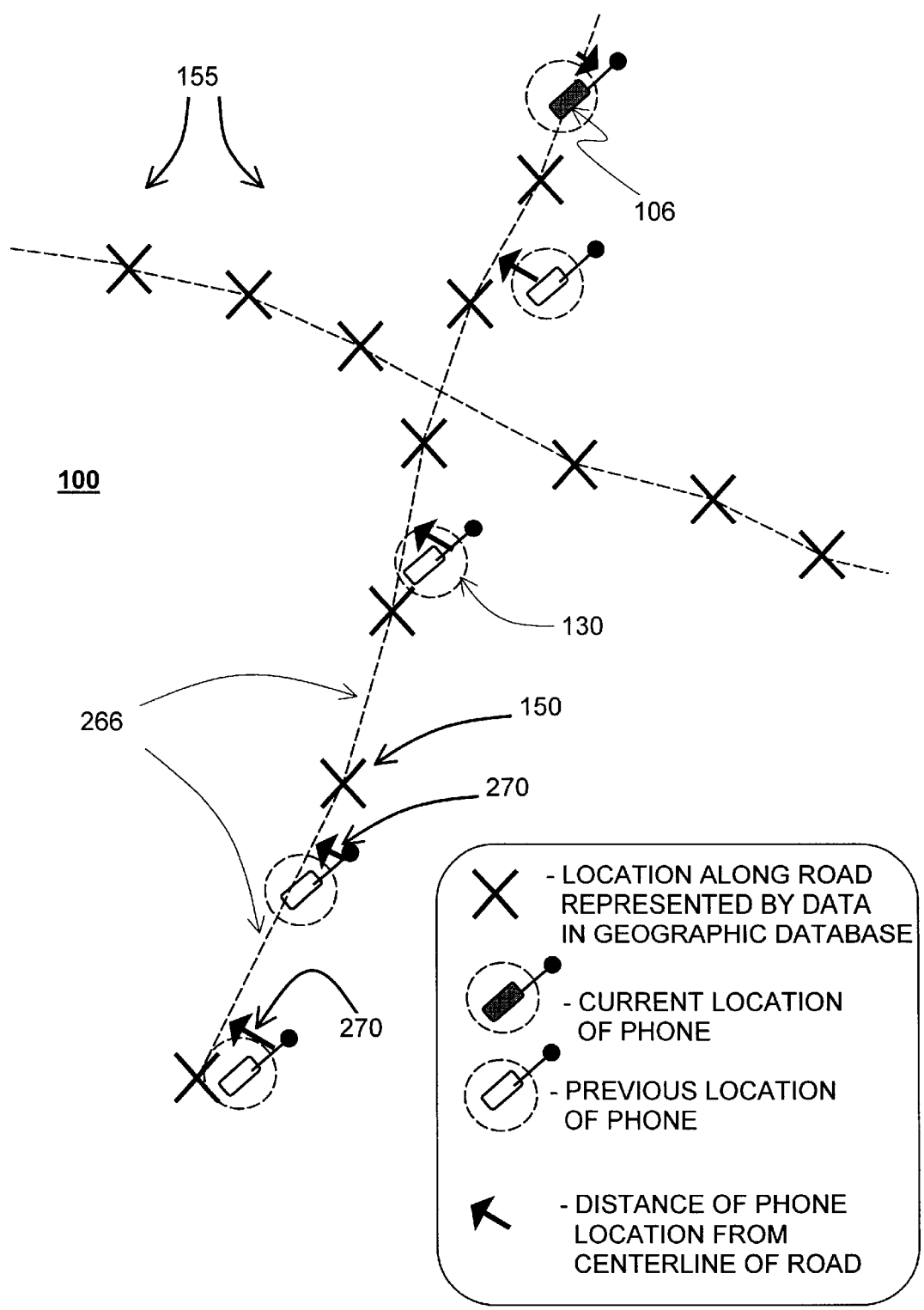
FIG. 5 shows the map of FIG. 3 illustrating the map matching process performed by the data collection system of FIGS. 1 and 4.

The matching process 256 optionally includes other processes 260 that perform analysis and filtration of the data 140. The analysis and filtration processes 260 may make use of several assumptions and/or observations. For example, if the acquired cellular position data 140 indicate that the cellular phone is on or within a certain threshold distance of the position of a road 152 or is moving, the cellular phone can be assumed to be inside of a vehicle traveling along the road. This is illustrated in connection with FIG. 5. In FIG. 5, straight dashed lines 266 are shown connecting the points 150 that are located along the actual roads (152 shown in FIG. 3) and for which data (174 in FIG. 4) are included in the geographic database to represent the positions of the roads. The straight dashed lines 266 in FIG. 5 approximate the actual paths of the roads represented by the points 150. (In an alternative embodiment, curved lines can be generated between the points 150 instead of straight lines. An appropriate curve fitting algorithm can be used.) The analysis process 260 computes a distance 270 between each of the locations 130 of the phone and the straight dashed lines 266 which represent the roads. If the distances 270 are sufficiently small, the cellular phone can be assumed to be in a vehicle traveling along the actual road.

Another operation that can be performed in the analysis and filtration step 260 is to determine a rate of travel of the cellular phone. The rate of travel can be used as a factor when determining whether the cellular phone is located in a vehicle traveling along the road. As mentioned above, the cellular phone location determining system 104 can acquire a plurality of locations for a single phone over a period of time. Each of these positions is associated with a time. Using each position of the cellular phone relative to the previous (in time) position, a rate of travel of the cellular phone across the geographic area can be determined. A direction of travel can also be determined. If the rate of travel is greater than a threshold, e.g., 5 miles per hour, a relatively high probability can be assigned that the cellular phone is located in a vehicle traveling along a road in the geographic area. The rate of travel of a cellular phone derived from the series of locations determined for the phone can be used in combination with other factors, such as the distances of the cellular phone locations from the centerline of the road, to determine a probability that the cellular phone is located in a vehicle traveling along the road.

Another operation that can be performed in the analysis and filtration step 260 is to use the type or category of the road as a factor when determining whether the cellular phone is located in a vehicle traveling along the road. If the geographic data 170 includes data that indicates a type or class for roads represented by the database, the type or class can be used in the matching and filtering steps. For example, if the position of the cellular phone coincides with (or is within a threshold distance of) a road and the road is classified as an "expressway", then a relatively higher probability can be assigned to the determination that the cellular phone is in a vehicle traveling along the road. On the other hand, if the position of the cellular phone coincides with (or is within a threshold distance of) a road and the road is classified as an "alley", then the determination that the cellular phone is in a vehicle traveling along the road has a relatively lower probability.

Using some or all of the factors described above, the process 260 in the data collection system 200 can filter and analyze the acquired data 140 that represent phone positions. Alternatively, the analysis and filtration step 260 can be skipped.

Following the analysis and filtration step 260, if performed, the data 210 representing the matched positions is output by the data collection system 200. These matched position data 210 may be used in various ways, as explained in more detail below.

III. Embodiments with Plurality of Phones

The process described above whereby positions of a cellular phone can be used to obtain matched position data can be used with the positions of a plurality of cellular phones. As explained above in connection with FIG. 1, the phone locating system 104 determines the positions of a plurality of cellular phones 106(1), 106(2) . . . 106(n). The locations of a plurality of positions from a plurality of cellular phones can be handled in the same manner as described above with respect to a single phone.

Figure 6:
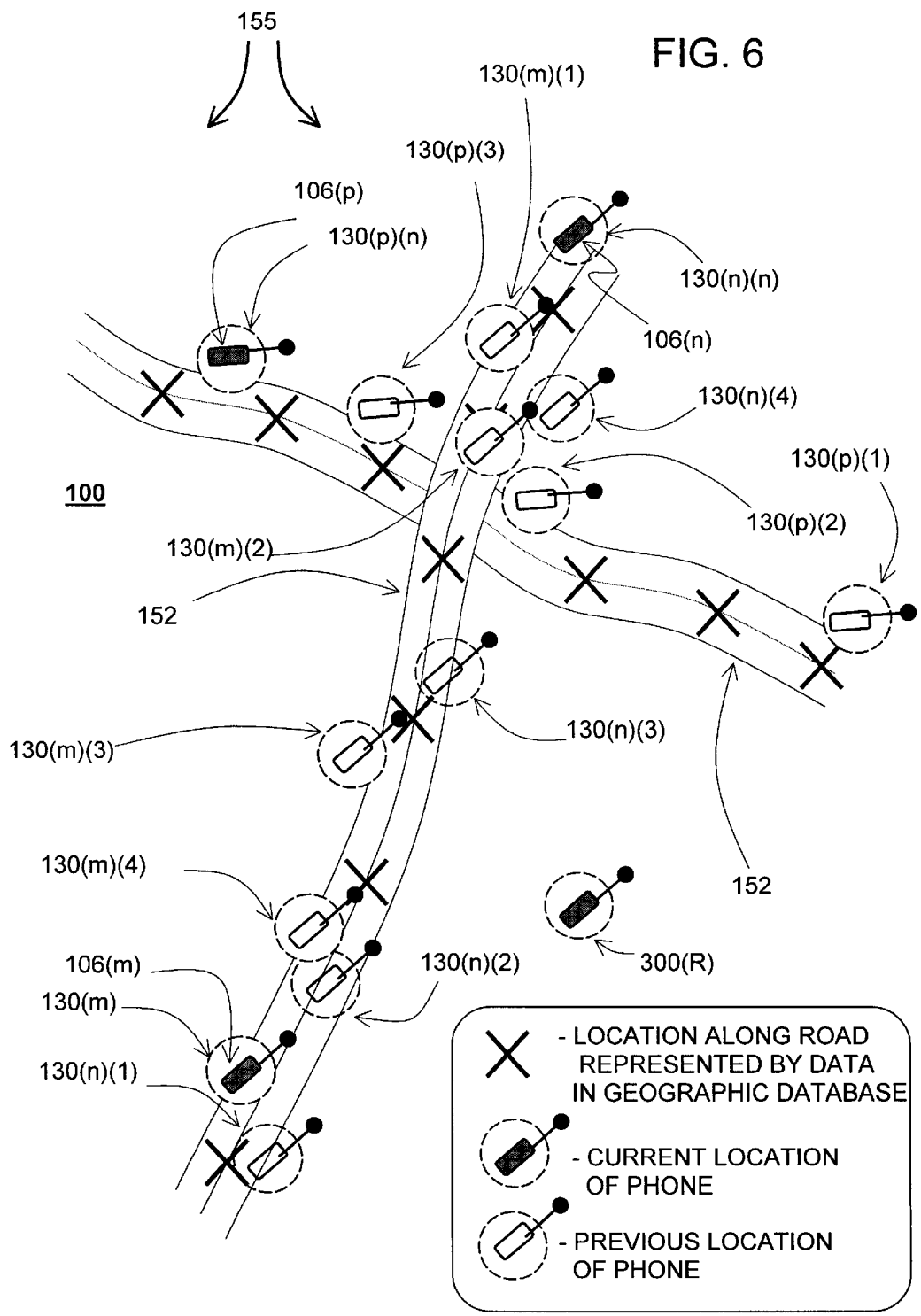
FIG. 6 is an illustration of a plurality of positions determined for a plurality of cellular telephones wherein the positions are determined using the cellular telephone location determining system shown in FIGS. 1 and 4.

FIG. 6 shows the plurality of positions 130(n)(1), 130(n)(1) . . . 130(n)(n) determined for a first cellular phone 106(n), the positions 130(m)(1), 130(m)(1) . . . 130(m)(n) determined for another cellular phone 106(m), the positions 130(p)(1), 130(p)(1) . . . 130(p)(n) determined for still another cellular phone 106(p), and so on. In this embodiment, hundreds, thousands, or millions of positions of hundreds, thousands, or millions of cellular phones may be acquired by the phone location determining system 104.

As described above in connection with FIG. 4, the data collection system 200 acquires data indicating these positions. The data collection system 200 can employ analysis and filtration steps 260 with respect to the acquired data. For example, as shown by FIG. 6, the plurality of cellular phone positions 130 can cluster along lines extending between the points 150 that define the positions of roads in the geographic database. As described above, the distances of these cellular phone positions from the paths of the roads can be used to determine which of the positions is associated with a cellular phone located in a vehicle. Any cellular phone location that is substantially away from the road positions 150 (such as the cellular phone position labeled 300(R)) can be assumed to be operated by a user who is not traveling along a road. Data indicating cellular phone positions that are located away from the road paths can be filtered out.

The locations of each of a plurality of cellular phones over time can also be collected, processed and analyzed using the processes described in connection with FIG. 4. Each cellular phone whose positions are being monitored includes a unique signature or ID. Thus, the rates of travel of the plurality of cellular phones along each of the plurality of roads can be determined. The directions of travel for the pluralities of phones can also be determined.

IV. Applications

The matched data 210 output by the data collection system 200 can be used in various ways.

A. Real-time Traffic Monitoring and Reporting

Figure 7:
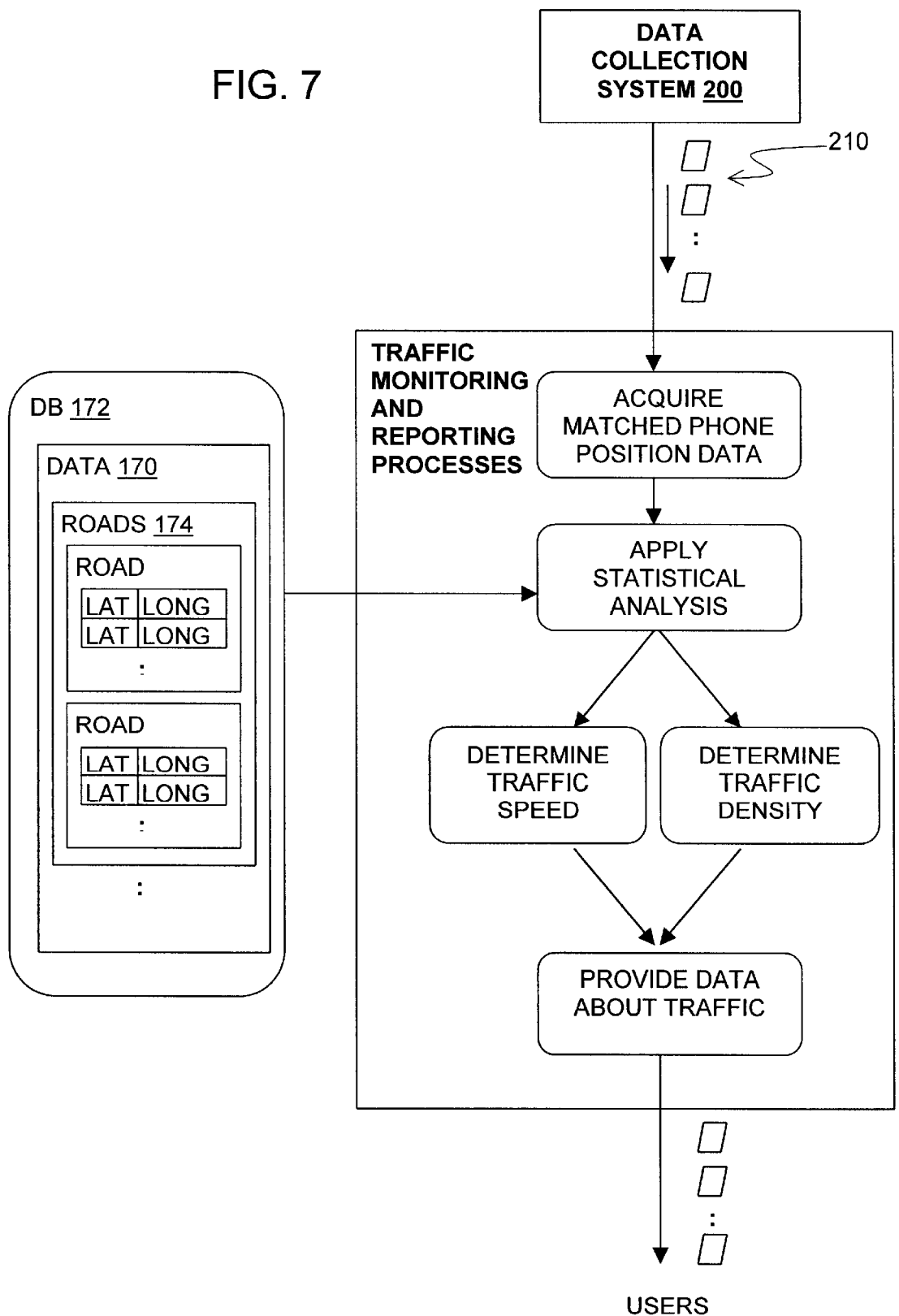
FIG. 7 is a flow chart showing a real-time traffic reporting system that uses the data collection system of FIG. 4.

In one embodiment, the output of the data collection system 200 can be used for traffic monitoring and reporting. Steps included for this traffic monitoring and reporting application are shown in FIG. 7. Using the matched phone location data for a plurality of cellular phones (such as shown in FIG. 6), a density of the clusters along the roads can be determined (e.g., cellular phones per length of road). From the density, an estimate can be made of how much traffic is travelling along the road. A rate of travel can also be determined for the plurality of phones. A rate of travel can be determined by the series of positions of each of the cellular phones. Thus, using the matched data of a plurality of cellular phones, average travel speeds along some or all the roads in a geographic area can be determined. This information can be used by traffic monitoring organizations. This traffic data can be broadcast (or otherwise reported) back to the users in the area. The data can be broadcast by radio or transmitted as telephone messages. Alternatively, the traffic can be sent in any type of traffic data format, such as the Radio Data System-Traffic Message Channel ("RDS-TMC"), and other data formats.

In a further embodiment, the data collection system 200 can determine which lanes of traffic on roads have the fastest rates of travel. When the data collection system 200 is used with a multi-lane road, the rates of travel of the cellular phones in each of the lanes can be determined. The rates of traffic in different lanes may differ significantly if an accident is blocking a lane. The location of an accident may be determined by detecting the location at which the rate of travel in a lane of traffic changes abruptly. When the data collection system detects a significant difference in the rates of travel in different lanes, a traffic message can be broadcast that informs vehicle drivers which lane(s) to avoid.

B. Geographic Database Updating and Refining

Figure 8:
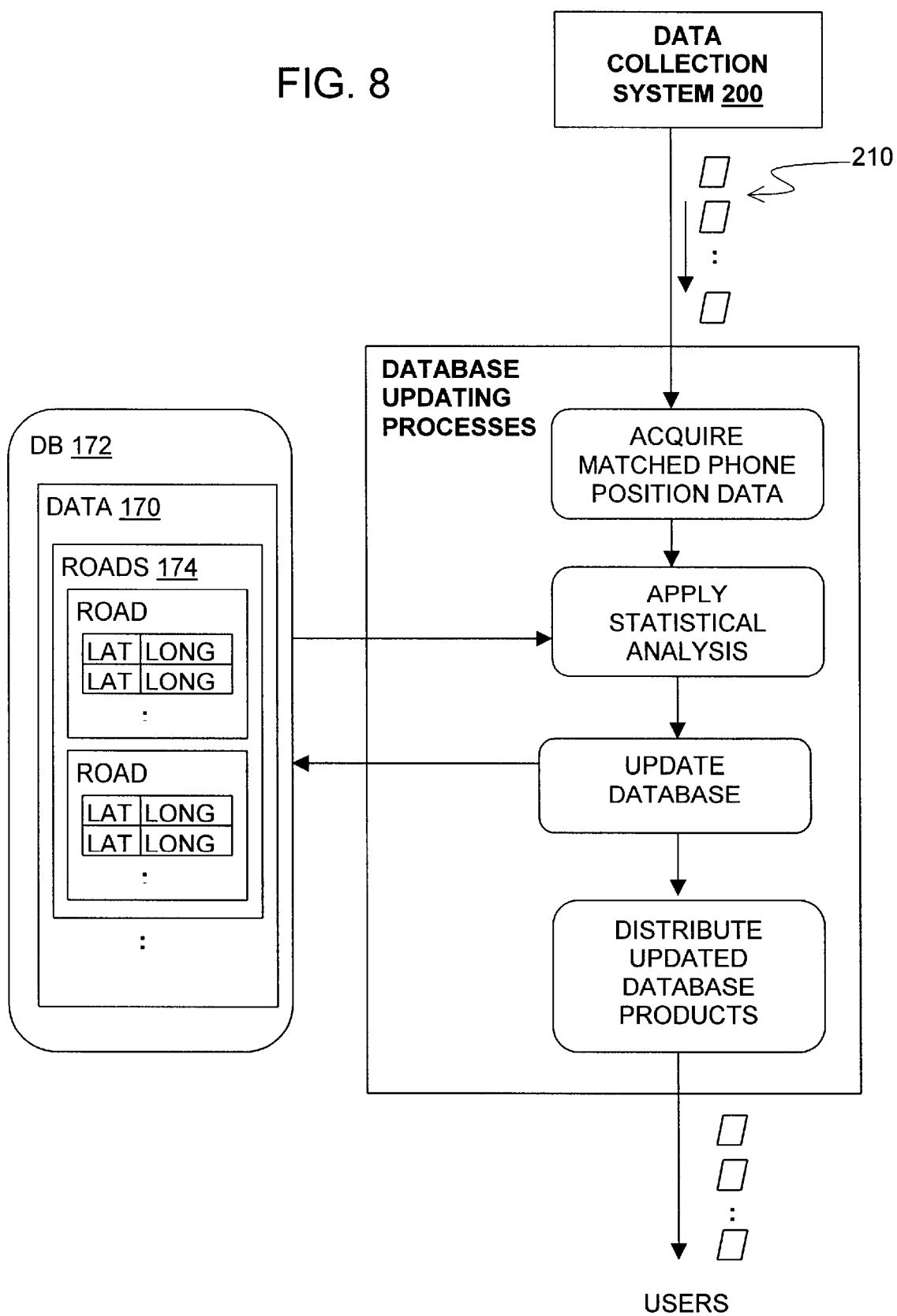
FIG. 8 is a flow chart showing a database updating system that uses the data collection system of FIG. 4.

Another application for the matched data obtained by the data collection system described above is the updating and refinement of a geographic database. As described in EP 0 921 509, a geographic database can be updated using data collected by a plurality of vehicles traveling an a geographic area. A geographic database can also be updated using the position data for a plurality of cellular telephones. Steps included for this application are shown in FIG. 8. According to this embodiment, the positions of cellular phones can be used in a similar way as the positions of probe vehicles, as described in EP 0 921 509. For example, the positions of cellular phones traveling through a geographic region can be used to add data representing new roads to the database. If a large number of cellular phone positions indicate a travel path through a location in a geographic region, it can be determined that a road passes through the point.

Data about traffic restrictions can also be derived. For example, if the cellular phones follow paths describing left turns from one road onto another except during the hours of 4:00 pm to 6:00 pm, data can be derived that a turn restriction exists at the intersection of these roads that prohibits left turns between these hours. Other data about the road network can be derived from the travel paths of cellular phones.

The positions of cellular phones traveling through the geographic area can also be used to update the data that indicate the positions of roads that are already represented in the geographic database. Using the positions of cellular phones that travel along roads can help increase the accuracy of the data that represent the positions used to represent roads in the database. Even if the cellular phone location determining system does not have very high accuracy, relatively high accuracy can be obtained by the statistical analysis of a large number of data points representing cellular phone locations over time. Then, the database with new, more accurate data can be used for subsequent cellular phone location matching. Thus, the acquisition of location data for cellular phones can be used in a feedback loop process that continues to improve the accuracy of the geographic database.

The geographic database with improved accuracy can be used to make derived database products. The derived database products may include only portions of all the data in the master version of the database. For example, the derived database products may include data that relate to only one or more specific regions.

The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet.

The derived database products can be used in various applications. For example, the derived database products may be used in navigation-related applications such as applications provided in in-vehicle navigation systems. The navigation-related applications may include route calculation, route guidance, vehicle positioning, map display, and electronic yellow pages, as well as other kinds of functions.

The derived database products may be in a different format than the format in which the master copy of the database is maintained. The derived database products may be in a format that facilitates the uses of the derived products in the platforms in which they are installed. The derived database products may also be stored in a compressed format on the media on which they are located.

The geographic database with improved accuracy can be distributed to users of systems that have safety-related features such as obstacle avoidance, automatic cruise control, etc.

V. Further Alternatives

As mentioned above, the cellular phone locating system may be implemented using any technology which is available now or that becomes available in the future.

The data collection system disclosed above is not limited to any particular wireless phone technology. Embodiments of the data collection systems, disclosed above, may be used with any kind of wireless phone whose position in a geographic area can be determined. Cellular, PCS, GSM, and other wireless technologies are all suitable.

With some embodiments of the cellular phone locating system, a phone does not have to be in use in order for the position of the phone to be determined.

Some cellular phones may include their own hardware and software that provide for determining the geographic position of the cellular phone. For example, some cellular phones may include GPS positioning systems. The disclosed data collection system could be used with these types of cellular phones.

Embodiments of the present system may also be used with electronic devices other than telephones. Embodiments of the disclosed data collection system may be used with pagers, for example.

In other alternative embodiments, the data collection system can include combinations of different remote devices, such as cellular phones and pagers, etc. In still another alternative embodiment of a data collection system, data collected from cellular phones can be combined with data collected with in-vehicle navigation systems, as described in EP 0 921 509.

In one of the embodiments described above, the locations of roads in a geographic region were represented in the geographic database by data that included the geographic coordinates of points along the represented roads. In alternative embodiments, locations of roads may be represented in a geographic database by other methods. Some other ways for representing locations of roads in a geographic database are described in U.S. Pat. No. 6,029,173, the entire disclosure of which is incorporated by reference herein. If an embodiment of the data collection system uses a geographic database that uses a method to identify the locations of roads other than by the geographic coordinates of points along the represented roads, an appropriate map matching process would be used to match the positions determined for the cellular phones to the locations of the roads represented by the geographic database.

VI. Advantages

The present system and method provide for collecting data geographic data efficiently and quickly. More particularly, the present system and method provide for collecting geographic data using an existing infrastructure that covers all roads.

It is intended that the foregoing detailed description be regarded as illustrative rather than limiting and that it is understood that the following claims including all equivalents are intended to define the scope of the invention.

We claim:

1. A method of collecting data comprising the steps of:
   determining positions of a plurality of cellular phones in a geographic area using a cellular phone location determining system, wherein the cellular phone location determining system is located outside the cellular phones;
   matching the positions of said plurality of cellular phones to positions of roads represented by data in a geographic database; and
   using a road category as a factor when matching said positions of said plurality of cellular phones to positions of roads represented by data in said geographic database to determine on which of said roads each of said cellular phones is located.

2. The method of claim 1 further comprising:
   determining rates of vehicular travel along said roads using said positions of said plurality of cellular phones.

3. The method of claim 2 further comprising:
   reporting said rates of vehicular travel to users of vehicles in said geographic area.

4. The method of claim 1 further comprising:
   determining traffic densities along said roads using said positions of said plurality of cellular phones.

5. The method of claim 4 further comprising:
   reporting said traffic densities to users of vehicles in said geographic area.

6. The method of claim 1 further comprising:
   determining a direction of travel of said plurality of cellular phones along a road.

7. The method of claim 1 further comprising:
   using said matched positions of said plurality of cellular phones to update the data representing roads in said geographic database.

8. The method of claim 7 further comprising:
   distributing said geographic database with said updated data to users of navigation systems in said geographic area.

9. The method of claim 7 further comprising:
   collecting positions along roads of a plurality of vehicles using data collected by in-vehicle navigation systems installed in said vehicles; and
   using said positions along roads of said plurality of vehicles in combination with said matched positions of said plurality of cellular phones to update the data representing roads in said geographic database.

10. The method of claim 7 wherein said updating step comprises:
adding data representing turn restrictions along roads.

11. The method of claim 7 wherein said updating step comprises:
adding data representing turn restrictions at specific times of day along roads.

12. The method of claim 1 wherein said cellular phone location determining system also determines positions of PCS phones.

13. The method of claim 1 further comprising the step of:
discarding positions of cellular phones that are greater than a threshold distance away from a road.

14. The method of claim 1 further comprising:
for each lane of a multi-lane road, determining a rate of vehicular travel using positions of cellular phones; and
when the rate of vehicular travel in one lane of the multi-lane road differs by a significant amount from a rate of vehicular travel in another lane of the multi-lane road, advising users of vehicles about which lane to avoid.

15. The method of claim 1 wherein the road category is represented by data in the geographic database that indicates a type or class for roads represented by the geographic database.

16. A method of collecting data comprising the steps of:
for each cellular phone of a plurality of cellular phones, determining a series of positions of said cellular phone in a geographic area over time using a cellular phone location determining system, wherein the cellular phone location determining system is located outside the cellular phones;
matching the series of positions of each cellular phone of said plurality of cellular phones to positions of roads represented by data in a geographic database to determine which of said roads each of said cellular phones is traveling along; and
using a road category as a factor when matching said positions of said plurality of cellular phones to positions of roads represented by data in said geographic database to determine on which of said roads each of said cellular phones is located.

17. The method of claim 16 further comprising the step of:
using the series of positions of each of said plurality of cellular phones to refine the data in said geographic database that represent said roads.

18. The method of claim 16 further comprising the step of:
statistically analyzing the series of positions of each of said plurality of cellular phones to determine locations of roads along which said plurality of cellular phones travel; and refining the data in said geographic database with the locations of roads determined by the statistical analysis of the positions of said plurality of cellular phones.

19. A method of collecting data comprising the steps of:
determining a position of a single of cellular phone in a geographic area using a cellular phone location determining system, wherein the cellular phone location determining system is located outside the cellular phones;
matching the position of said cellular phone to positions of roads represented by data in a geographic database to determine on which of said roads said cellular phone is located; and
using a road category as a factor when matching said position of said cellular phone to positions of roads represented by data in said geographic database to determine on which of said roads said cellular phone is located.

20. The method of claim 19 further comprising:
determining a plurality of positions of said single cellular phone in said geographic area using said cellular phone location determining system; and
matching said plurality of positions of said single cellular phone to positions of roads represented by data in said geographic database to determine on which of said roads said cellular phone is located.

21. The method of claim 20 further comprising:
determining a rate of travel of said cellular phone along a road.

22. The method of claim 20 further comprising:
determining a direction of travel of said cellular phone along a road.

23. A method of collecting data comprising the steps of:
determining positions of a plurality of cellular phones in a geographic area using a cellular phone location determining system;
matching the positions of said plurality of cellular phones to positions of roads represented by data in a geographic database;
for each lane of a multi-lane road, determining a rate of vehicular travel using positions of cellular phones; and
when the rate of vehicular travel in one lane of the multi-lane road differs by a significant amount from a rate of vehicular travel in another lane of the multi-lane road, advising users of vehicles about which lane to avoid.

* * * * *